United States Patent
Guering et al.

(10) Patent No.: US 10,737,767 B2
(45) Date of Patent: Aug. 11, 2020

(54) AIRCRAFT RUDDER BAR SUSPENDED OVER FLIGHT DECK FLOOR

(71) Applicant: AIRBUS OPERATIONS (SAS), Toulouse (FR)

(72) Inventors: Bernard Guering, Montrabe (FR); Laurent Saint-Marc, Montaigut sur Save (FR)

(73) Assignee: Airbus Operations (SAS), Toulouse (FR)

( * ) Notice: Subject to any disclaimer, the term of this patent is extended or adjusted under 35 U.S.C. 154(b) by 725 days.

(21) Appl. No.: 15/332,247

(22) Filed: Oct. 24, 2016

(65) Prior Publication Data
US 2017/0113784 A1    Apr. 27, 2017

(30) Foreign Application Priority Data
Oct. 23, 2015   (FR) .................................... 15 60116

(51) Int. Cl.
*B64C 13/04*   (2006.01)
*B64C 13/28*   (2006.01)

(52) U.S. Cl.
CPC ............ *B64C 13/04* (2013.01); *B64C 13/044* (2018.01); *B64C 13/341* (2018.01); *Y02T 50/44* (2013.01)

(58) Field of Classification Search
CPC ......... B64C 13/04; B64C 13/30; B64C 13/12; B64C 13/06; B64C 13/044; B64C 13/10; B64C 27/56; Y02T 50/44
See application file for complete search history.

(56) References Cited

U.S. PATENT DOCUMENTS

| | | | | |
|---|---|---|---|---|
| 1,795,910 A | * | 3/1931 | Wait, Jr. ................. | B64C 13/06 244/111 |
| 2,424,523 A | * | 7/1947 | Watter .................... | B64C 25/44 244/235 |
| 2,539,753 A | * | 1/1951 | Peterson ................ | B64C 13/06 244/233 |
| 2,585,688 A | * | 2/1952 | Saulnier ................. | B64C 13/04 244/235 |
| 2,610,006 A | * | 9/1952 | Boyce .................... | B64C 13/02 244/235 |
| 3,576,302 A | * | 4/1971 | Palfreyman ............ | B64C 13/24 244/196 |

(Continued)

FOREIGN PATENT DOCUMENTS

FR       1006297        4/1952

OTHER PUBLICATIONS

French Search Report cited in FR 1560116 dated Jun. 14, 2016, two pages.

*Primary Examiner* — Medhat Badawi
*Assistant Examiner* — Vicente Rodriguez
(74) *Attorney, Agent, or Firm* — Nixon & Vanderhye P.C.

(57) ABSTRACT

A suspended rudder bar for aircraft and aircraft having a suspended rudder bar, which includes a set of primary hinges, a set of secondary hinges including control and synchronization devices, and a set of linkages generating functional and structural links between the set of primary hinges and the set of secondary hinges, wherein the primary hinges are configured to be suspended at least on a structure supporting the instrument panel of the flight deck of the aircraft, and the secondary hinges configured to be suspended at least on a structural component of an area situated forward of the flight deck.

15 Claims, 5 Drawing Sheets

(56) References Cited

U.S. PATENT DOCUMENTS

| | | | | |
|---|---|---|---|---|
| 4,778,133 | A | * | 10/1988 | Sakurai .................. B64C 13/04 244/220 |
| 5,056,742 | A | * | 10/1991 | Sakurai .................. B64C 13/06 244/235 |
| 9,764,830 | B2 | * | 9/2017 | Yates ...................... B64C 13/04 |
| 2014/0131523 | A1 | | 5/2014 | Carner et al. |

* cited by examiner

AIRCRAFT RUDDER BAR SUSPENDED OVER FLIGHT DECK FLOOR

RELATED APPLICATION

This application claims priority to French Patent Application 1560116 filed Oct. 23, 2015, the entirety of which is incorporated by reference.

BACKGROUND

The present invention relates to a rudder bar for an aircraft, such as transport aircraft. A rudder bar is a mechanical device that allows the pilot and the co-pilot to control the rudder and the wheel brakes.

The rudder bar comprises pedals and a set of moving parts which, according to movements applied to the pedals by the pilot or pilots, control the rudder or the brakes of the aircraft.

A conventional rudder bar is supported at the floor of a flight deck, in that it is integrated in the floor of the flight deck and may even traverse the flight deck. A "supported" rudder bar is one that rests on the floor of the flight deck of the aircraft. The attachment of the rudder bar and the transmission of commands from the rudder bar to the rudder and/or the brakes take place under the floor of the flight deck. This under-the-floor attachment architecture is the consequence of a choice, in the case of a rudder bar mechanically connected to the components to be controlled (particularly the rudder), of communicating through the area under the floor (connections through rods, rotating sectors and cables), which is easier to embody on an aircraft.

Once the localization of the rudder bar (supported rudder bar) has been established, it is necessary to integrate into the flight deck the actual volume of the rudder bar, which is significant, while allowing only the functions particular to the pilots' ergonomics to appear in the flight deck. The conventional supported rudder bar architecture places a high strain on the floor structure of the forward part of the flight deck with a significant spatial requirement, and it results in a complex floor, due in particular to the presence of the housing required for the rudder bar, which in particular is not very compatible with a modular type of structure.

DESCRIPTION OF THE INVENTION

The present invention provides a new rudder bar architecture that overcomes some or all of the disadvantages of a supported rudder bar. In an embodiment, the invention is a rudder bar for an aircraft comprising a flight deck equipped with an instrument panel and an area forward of the flight deck, an instrument panel incorporating a supporting structure, and the rudder bar comprises a set of primary hinges incorporating pedals, a set of secondary hinges, and a set of structural links (rods) between the set of primary hinges and the set of secondary hinges.

The pedals may be configured to be suspended above the flight deck floor. The pedals may also be configured to be supported by the same structure supporting the instrument panel. Moreover, at least some of the secondary hinges may be configured to be suspended and to be suspended on at least one structural component of an area forward of the flight deck.

The set of primary hinges may be configured to be suspended from the same structure that supports the instrument panel of the flight deck. The set of secondary hinges is configured to be suspended above the flight deck (floor) and configured to be supported by a structural component of a forward area of the flight deck.

The suspended rudder bar disclosed herein may be embodied to not be fastened to the flight deck floor and be suspended above the flight deck floor. Further, the rudder bar is in a forward section of the flight deck. The rudder bar therefore need not be integral with the flight deck floor. The suspected rudder bar may have the same functionalities as a conventional rudder bar as described below. The suspended rudder bar frees up space in the flight deck and specifically on the floor. The suspended flight deck facilitates installation of a modular structure, which makes it possible to remedy the aforementioned disadvantage.

In an embodiment of the invention, the set of primary hinges comprises, for each pedal, a pedal arm to which the pedal is connected, the pedal arm being mounted to move in rotation on a structural component, said structural component being configured to be suspended, at least on the structure supporting the instrument panel of the flight deck.

Furthermore, the set of secondary hinges advantageously comprises a steering shaft mounted to move in rotation around a steering axis, the steering shaft being linked via at least one linkage to a steering position sensor.

Furthermore, the set of structural links advantageously comprises: for each pedal, a rod, connected at one of its extremities, in a hinged manner, to one extremity of a pedal arm, and by the other of its extremities, in a hinged manner, to one extremity of a steering shaft; and at least one fixed structural rod.

Furthermore, the rudder bar is advantageously equipped with two pairs of pedals and a steering interconnecting rod that transmits an operation of one pair of pedals to the other pair of pedals. The steering interconnecting rod is preferably linked, in a hinged manner, to the transmission shafts each associated respectively with one of the two pairs of pedals.

Furthermore, in an embodiment of the invention, each of said pedals is mounted on a pedal arm, and each of said pedal arms is made in the shape of a shell.

Furthermore, the rudder bar may incorporate an adjustment assembly that is configured to allow an operator to change the positions and travel of the pedals.

The present invention may be applied to an aircraft, in particular a transport aircraft, equipped with a rudder bar such as that described above.

In another embodiment, said set of primary hinges is suspended at least on the structure supporting the instrument panel of the flight deck of the aircraft, and said set of secondary hinges is suspended at least on a structural component of the forward area.

BRIEF DESCRIPTION OF THE FIGURES

The attached figures will provide good understanding of how the invention can be embodied. On these figures, identical reference numbers designate similar components.

DETAILED DESCRIPTION

Figure 1:
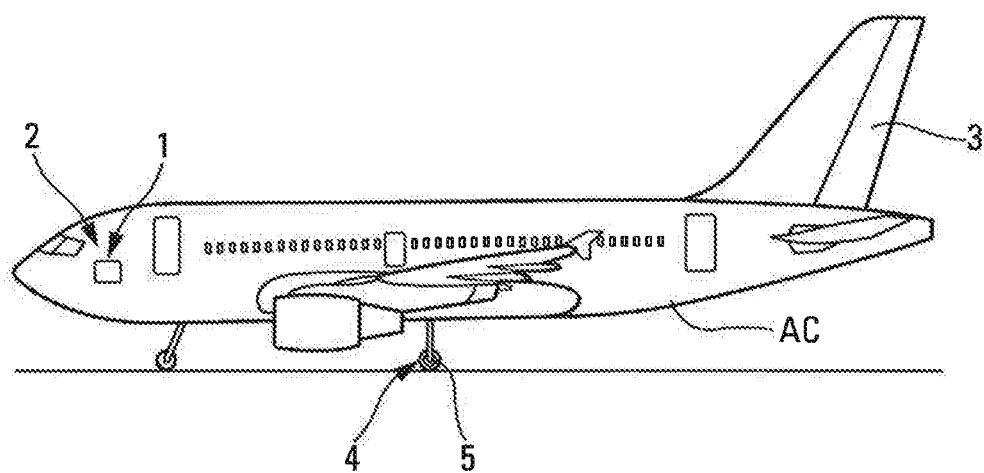
FIG. 1 shows an aircraft on the ground that incorporates a rudder bar according to an embodiment of the invention.

FIG. 1 shows an aircraft AC, such as a transport aircraft, which comprises a flight deck 2 having a rudder bar 1 shown schematically in FIG. 1. The aircraft AC also includes a rudder 3 in an empennage and brakes 4 on the wheels 5 of a main landing gear of the aircraft AC.

Figures 2A, 2B:
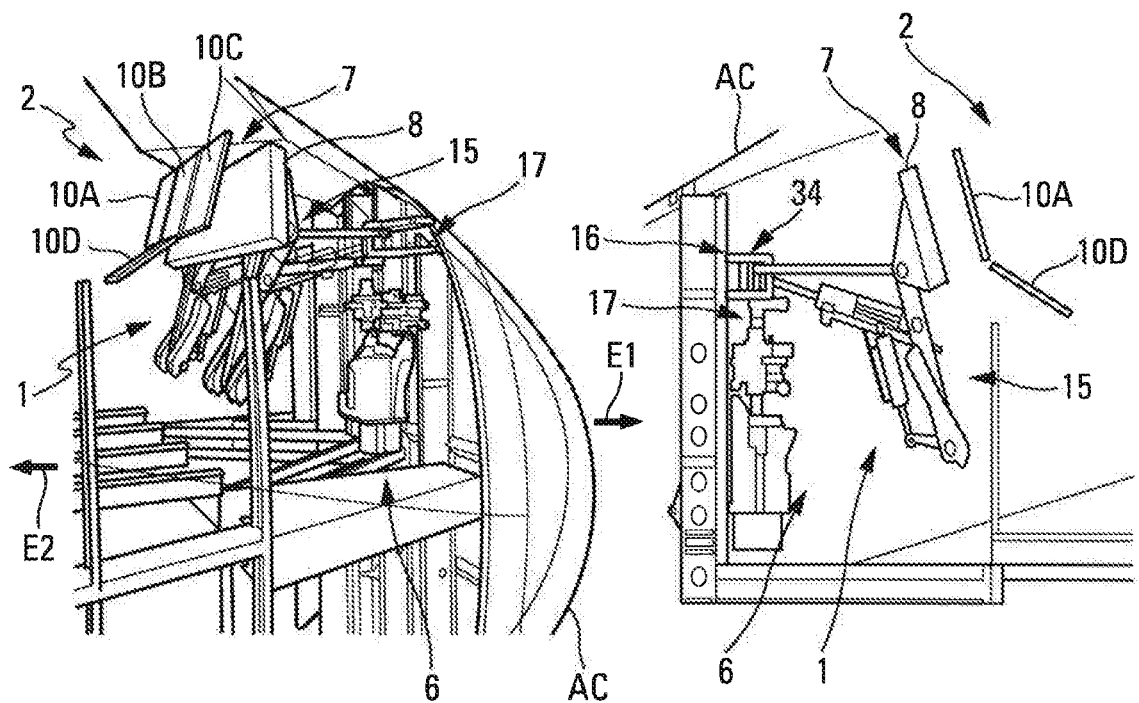
FIGS. 2A and 2B are two views, perspective and side views respectively, of a forward structure of an aircraft equipped with a rudder bar according to an embodiment of the invention.

FIGS. 2A and 2B show the rudder bar 1 in a forward area 6 of the flight deck 2. The flight deck may be at or near the front end (nose) of the fuselage of the aircraft AC. The flight deck includes an instrument panel 7 with a set 9 of electronic displays 10A to 10D. The instrument panel and its set 9 of displays are supported in the flight deck by a supporting structure 8, such as a supporting panel.

Figure 3:
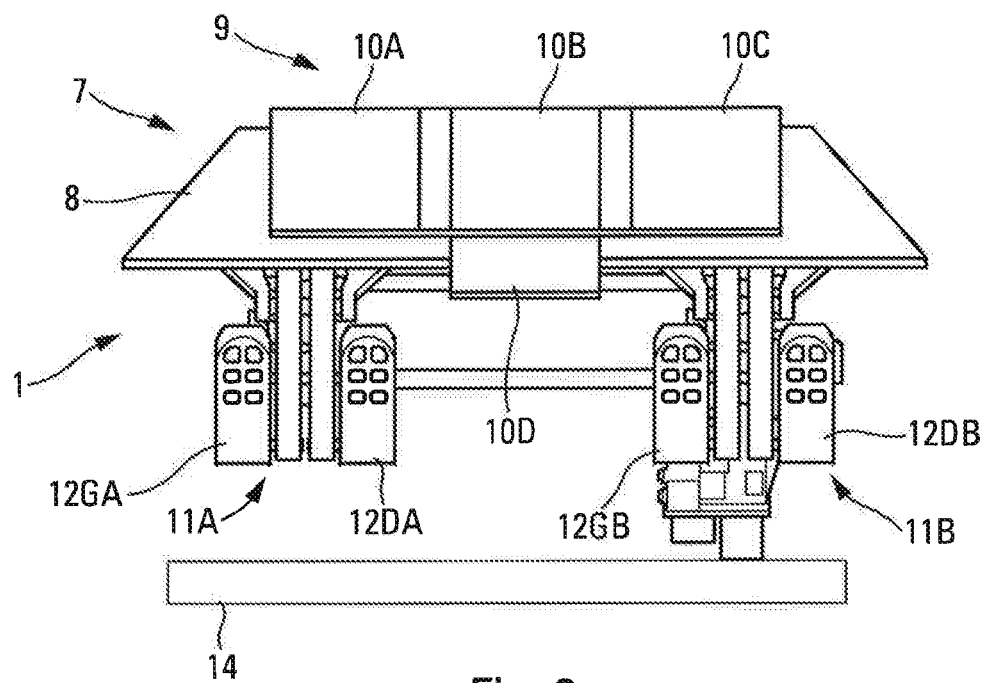
FIG. 3 is a diagrammatic plan view of a rudder bar suspended from a supporting structure for an instrument panel.

FIG. 3 shows the displays 10A, 10B, 10C and 10D, which comprise the set 9. The displays are in the flight deck 2 and are aft of the structure 8 supporting the instrument panel 7.

In the context of the present invention, the directions "aft" and "forward" are defined in relation to the longitudinal direction of the aircraft AC, namely, for "forward", as illustrated in FIG. 2B by an arrow E1 towards the front of the aircraft AC and, for "aft", as illustrated by the arrow E2 towards the rear of the aircraft AC.

The rudder bar 1 is intended for a transport aircraft. The rudder bar 1 may be configured to be operated by either or both of two pilots, such as a commanding pilot and a co-pilot. The rudder bar 1 comprises two pairs of foot pedals 11A and 11B. A first pair of pedals 11A is on the left side of the flight deck looking forward and is intended to be operated by the commanding pilot. The pair of pedals 11A comprises two foot pedals 12DA and 12GA intended to be operated by the two feet, right and left respectively, of the commanding pilot. The second pair of foot pedals 11B is on the right of the flight deck and is configured for operation by the co-pilot. This pair of foot pedals 11B comprises two foot pedals 12DB and 12GB configured to be operated by the right and left feet, respectively, of the co-pilot.

The rudder bar 1 is fastened, in a suspended manner, above the floor 14 of the flight deck 2. The rudder bar is supported by the same supporting structure 8 which supports the instrument panel 7. The supporting structure 8 is itself supported by at least one structural component 16 (FIG. 2B) at the forward area 6 of the flight deck 1. The structural component 16 may be a vertically oriented rigid beam fixed to or part of a frame (former) of the fuselage.

The rudder bar 1 incorporates a first set of hinges 15 (primary hinges) which comprises the two pairs of pedals 11A and 11B and associate linkages includes a pedal arm 19. The set of primary hinges 15 is suspended from and supported by the supporting structure 8. The set of primary hinges comprise the pedals and adjustment mechanisms for the pedals.

The rudder bar 1 also incorporates a second set of hinges 17 (secondary hinges) comprising control and synchronization devices, and various items of equipment as described below. The set of secondary hinges 17 is configured to be suspended from and supported by the structural component 16 at the forward area 6 which may be proximate a front end of the flight deck. The set of secondary hinges comprise controls and synchronization equipment for detecting and monitoring the control inputs by each of the pair of pedals 11A, 11B. The two sets of primary and secondary hinges 15 and 17 are linked together, as described below, by a transmission assembly 25 (FIG. 4) described below.

The rudder bar 1 therefore comprises the set of primary hinges 15 (pedals and adjustment mechanisms), which is mounted on the structure 8 supporting the instrument panel 7; the set of secondary hinges 17 (controls, synchronization, equipment), which is mounted on a rear face of a flat structural sealed base 16, of the forward area 6. The transmission assembly 25 provides functional and structural links between two sets of primary and secondary hinges 15 and 17.

The rudder bar 1 is of the suspended (or hung) type and may be partially integrated in the structure 8 supporting the instrument panel 7. The functions of the rudder bar are distributed in two areas: the instrument panel and the forward area equipped with a structural base. All of the functions are preserved as is described below.

The above described architecture of the rudder bar is suspended above the floor 14 of the flight deck. This architecture frees up floor space in the flight deck. The architecture also simplifies the installation of the rudder bar 1 as compared with a conventional rudder bar architecture that is supported on and extends through the floor of the flight deck. The rudder bar 1 thus uses a new space created on modern aircraft and not utilized. The new generation of on-board instruments and displays of the instrument panel, due to the change from cathode ray tubes to flat screens, frees up a large volume on the other side of the instrument panel in the forward area 6 (FIGS. 2A and 2B). The suspended rudder bar 1 utilizes this newly available space behind the instrument panel.

Figure 4:
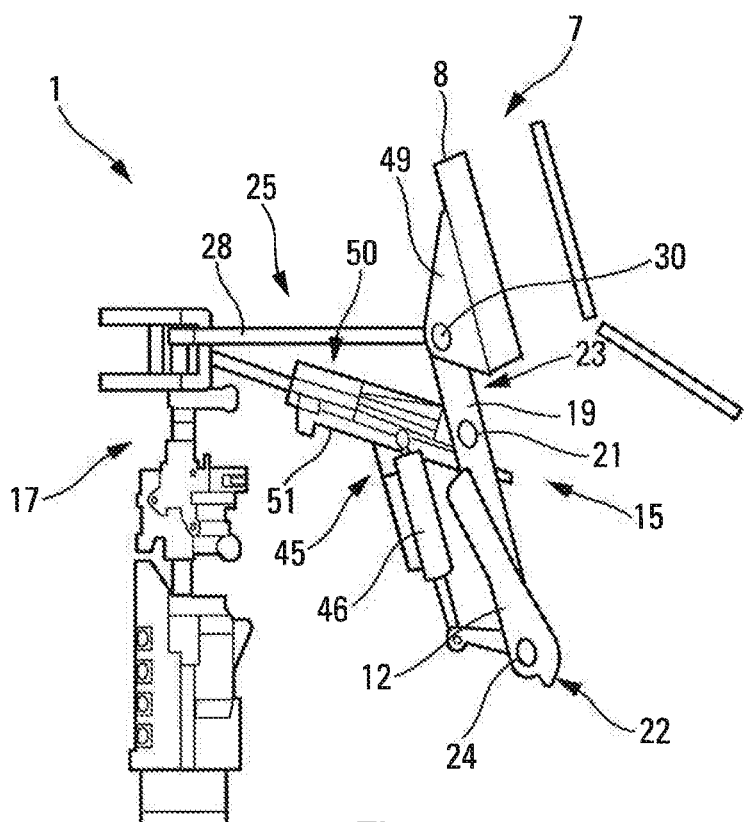
FIG. 4 shows a side view of the rudder bar.

As shown in FIG. 4, the set of primary hinges 15 comprises, for each pedal 12 (for example pedal 12GA), a pedal arm 19 to which the pedal 12 is connected.

For a steering command, the pedal lever arm 19 is mounted to structure component 20 (FIG. 5) to move in rotation about axis 21. The structure component 20 is fixed to the structure 8 which supports the instrument panel. Each pedal lever arm 19 and its associated pedal is suspended from the structure 8 and pivots about axis 21 when the pilot presses the associated pedal.

The pedal lever arm 19, having an elongated shape, is made in the shape of a shell. The pedal arm has a lower extremity 22 and an upper extremity 23, which extend, substantially vertically, on either side of the axis of rotation 21. The lower extremity 22 is oriented towards the floor relative to the axis of rotation 21.

In the context of this description, the terms "lower", "upper", "high" and "low" are defined along a vertical direction that is orthogonal to a horizontal plane defined by the floor.

The pedal 12 is pivotably mounted on the lower extremity 22 of the pedal lever arm to move in rotation around an axis of rotation 24. This axis of rotation 24 is parallel to the axis of rotation 21 and it is distanced from axis 21 in a downward direction towards the floor. The pilot pivots the pedal about axis 24, generally horizontal, to input a braking command which is transmitting to the wheel brake.

The transmission assembly 25 is configured to transmit a displacement of the set of primary hinges 15 towards the set of secondary hinges 17 when one (or more) of the pedal lever arms 19 pivots around the axis of rotation 21.

Figure 5:
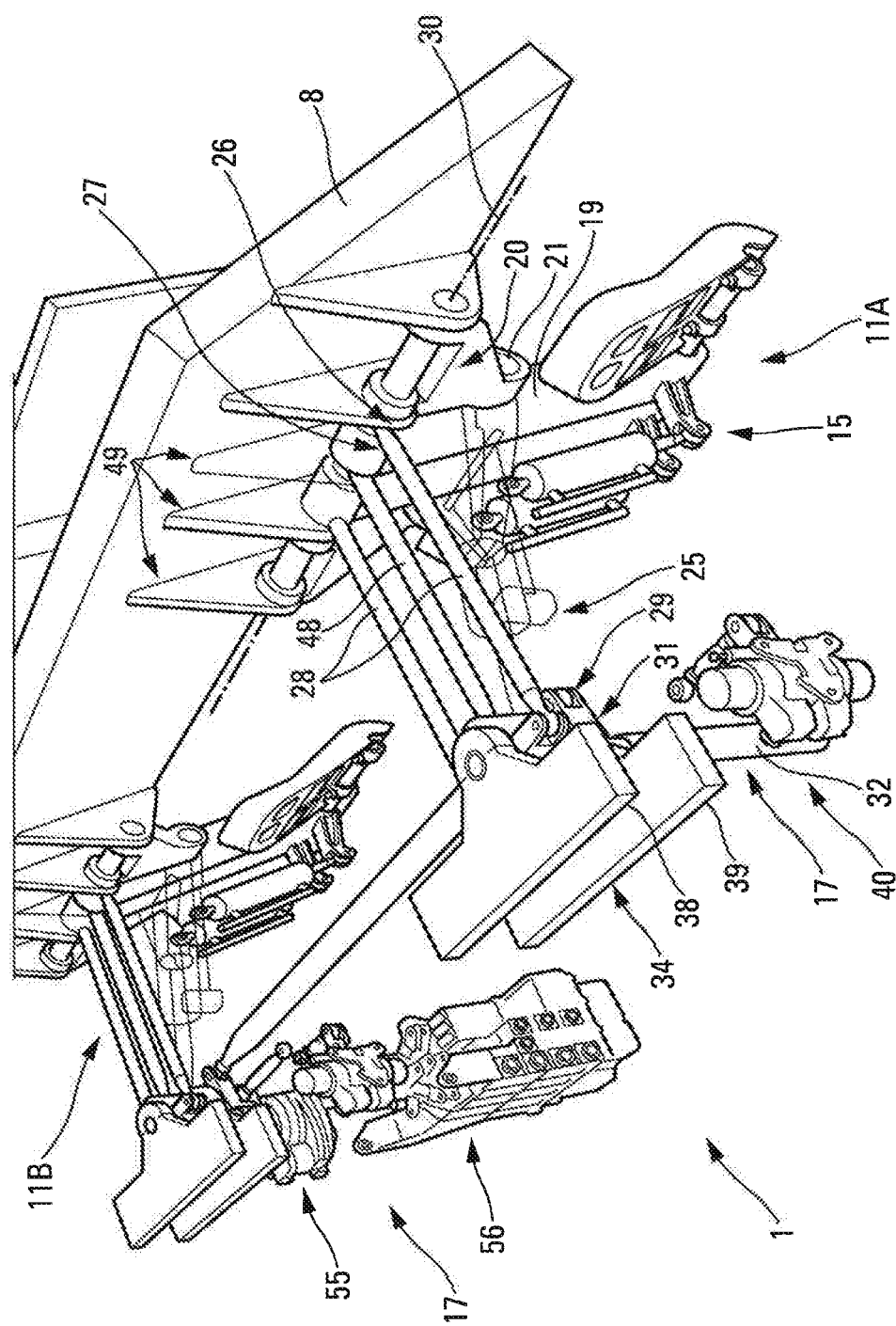
FIG. 5 is a partial view, in perspective, of the rudder bar.

As shown in FIG. 5, the upper extremity 26, 23 of each of the pedal lever arms 19 is connected, in a hinged manner, to a first extremity 27 of one of the rods 28. The rods 28 are each connected at their other extremity 29 and in a hinged manner to an upper extremity 31 of a steering shaft 32. As is visible in FIG. 8, the steering shaft 32 is mounted to move in rotation around a steering axis 33 that may be vertical.

The steering shaft 32 is mounted at its upper extremity 31 to a structural bearing 34 described below. This structural bearing 34 is attached to the structural component 16 of the forward area 6 of the aircraft (FIG. 2B).

The extremities 29 of each of the rods 28 are mounted, in a hinged manner, on opposite ends of a hinge component 35 of the steering shaft. The hinge component 35 is attached at the upper extremity 31 of the steering shaft 32. The hinge component 35 is turned by the rods 28 and causes the steering shaft to turn (F5) about its axis 33. The rods 28 are axially displaced (F3, F3A) by movement of the pedals which turn the pedal arm 19 about axis 21.

Figure 8:
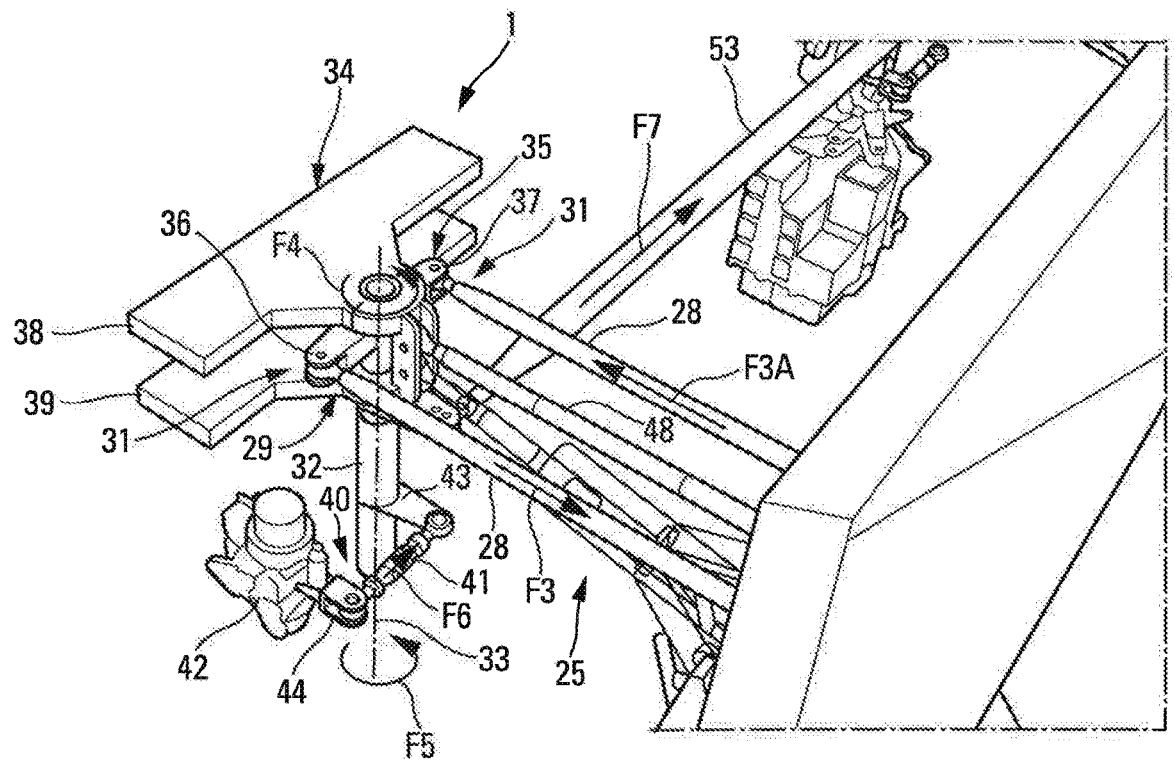
FIGS. 8 and 9 show, respectively, left and right parts of a rudder bar allowing the actions generated by operating a pedal to be explained.

The axial displacement of the rods 28 turn the hinge component 35, as shown in FIG. 8. This hinge component 35 comprises two stirrups 36 and 37 extending on either side of the steering shaft 32 in a plane (horizontal) substantially perpendicular to the axis of rotation 33. In each stirrup 36 and 37, the extremity 29 of one of the rods 28 is rotationally mounted. Each of the rods 28 being associated with a respective one 12GA/12GB of the pedals of a pair 11A or 11B of pedals. There is one rod 28 associated with each of the pedals 12DA/12DB of both pair of pedals.

The structural bearing 34 comprises two parallel plates 38 and 39 (FIGS. 5 and 8), positioned substantially horizontally and configured to be attached to the structural component 16 of the forward area 6 (FIG. 2B). The steering shaft 32 is mounted, in its lower part 40 in a bearing not illustrated. The steering shaft 32 is connected via a linkage 41 to a steering position sensor 42. This linkage 41 is placed substantially orthogonal to the axis of rotation 33 of the steering shaft.

The linkage 41 is mounted, in a hinged manner, at one extremity on a projecting part 43 of the steering shaft 32 and by at an opposite extremity to a connecting means 44, for example in the shape of a stirrup, which is attached to the steering position sensor 42, as is visible in FIG. 8.

The steering position sensor 42 is configured to measure the direction and amplitude of the rotation of the steering shaft 32. This direction and amount of rotation, e.g., number of degrees, of the steering shaft is determined and generated by an action of a pilot on at least one of the pair 11A, 11B of the pedals. The action of the pilots on the pedal pivots the pedal arm 19 about axis 21 which axially displaces the rod 28 linked to the pedal being displaced by the pilot.

The transmission assembly 25 allows: (i) the rotation of the pedal arm 19 around the axis of rotation 21 (by operating the pedal 12) in one direction to drive the rotation of the steering shaft 32 in a first direction; and (ii) the rotation of the pedal arm 19 around the axis of rotation 21 (by operating the pedal 12) in the opposite direction to drive the rotation of the steering shaft in a second direction opposite said first direction.

The steering position sensor 42 transforms, in a conventional manner, the mechanical command representative of the rotation of the steering shaft 32 into an electric signal. This electric signal is then transmitted, in a conventional manner, to a steering system (not illustrated) of the rudder in order to control steering of the aircraft.

Furthermore, the pedal arm 19 is connected to a braking linkage 46 as shown in FIG. 4. The rudder bar 1 also comprises a transmission assembly not illustrated and placed in part in an area localized by an arrow 45 in FIG. 4. This transmission assembly is configured to transmit a displacement when the pedal 12 pivots around the axis of rotation 24. To that effect, the transmission assembly is connected to a braking control unit (not illustrated). When the transmission assembly is maneuvered, it transmits a mechanical command to the braking control unit, which transforms this mechanical command into an electric signal, this electric signal then being transmitted to an activation system (not illustrated) configured to activate the brakes 5 of the aircraft AC (FIG. 1).

The above description, which was made with reference to a single pedal, applies to each of the pedals of the rudder bar 1 and to their associated pedal lever (primary hinge), rod (structural link) and hinge component 35 (secondary hinge).

The rudder bar 1 furthermore comprises, between the rods 28 respectively associated with the two pedals of the same pair of pedals, a fixed structural rod 48 as shown in FIG. 5. This structural rod 48 contributes to the strength of the supporting structure 8 and to holding the rudder bar 1. The structural rod may be pivotably fixed to the structural component of the fuselage by the structural bearing, which includes plates 38, 39 that are fixed to the structural component 16. The structural rod may form a cantilevered beam support for the supporting structure 8 which, in turn, supports the instrument panel 7 and a pair of the pedals 11A or 11B and the pedal arm (primary hinge) corresponding to the pair of pedals.

The supporting structure 8 comprises a plurality of supporting plates 49, for example of a generally triangular shape, which have hinges coaxial to an axis of rotation 30. These supporting plates 49 are attached so as to project perpendicularly on the supporting structure 8 towards the front of the aircraft. They serve to support the set of primary hinges 15 on the supporting structure 8. The supporting plates 49 also serve to support the supporting structure 8, on the structural rod 48. The structural rod 48 may form a cantilevered beam support for the supporting structure.

Figure 6:
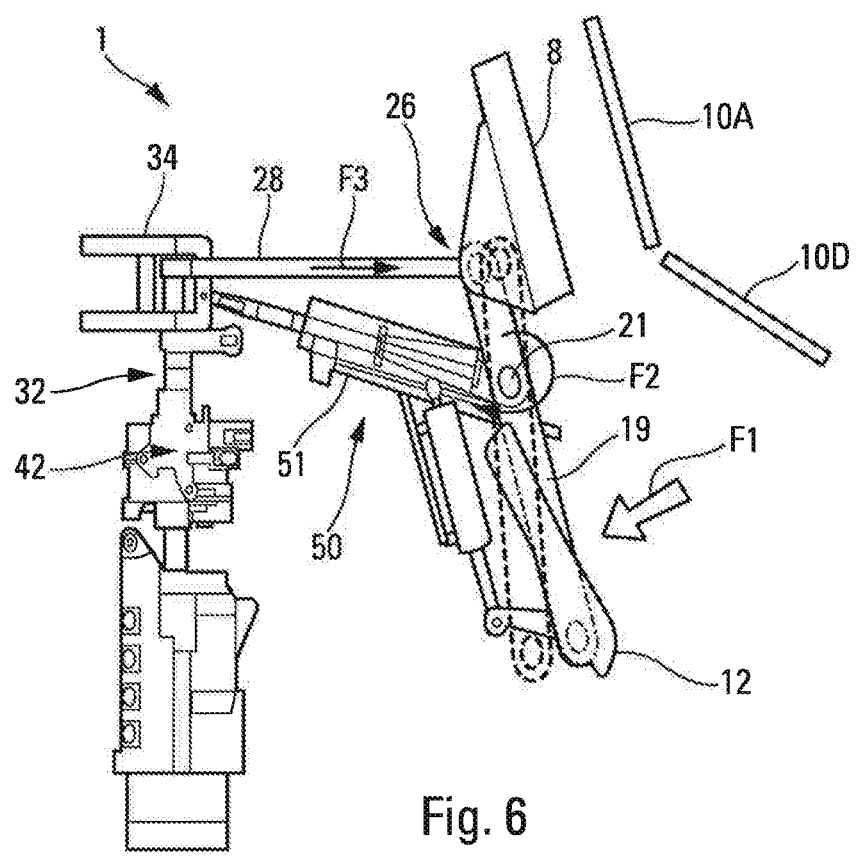
FIG. 6 shows a side view similar to that of FIG. 4 allowing the effects of operating a pedal to be shown.

The functioning of the rudder bar 1 as described above is as follows for controlling steering of the aircraft. When a foot of a pilot depresses the pedal 12 from a neutral position as illustrated by an arrow F1 in FIG. 6, the displacement of the pedal 12 drives the pedal arm 19 (illustrated by an arrow F2) in rotation around the axis of rotation 21. The neutral position is the position of the pedal 12 when the pilot is not pressing on the pedal 12.

The rotation of the pedal arm 19 generates a lateral displacement of the rod 28 (as illustrated by an arrow F3) which, by its displacement, drives the steering shaft 32 in rotation via the hinge component 35 (which turns as shown by an arrow F4 in FIG. 8). The rotation of the steering shaft 32 (illustrated by an arrow F5) is transmitted to the steering position sensor 42 via the linkage 41, which is displaced in the direction of an arrow F6. The steering sensor 42 transforms the mechanical command then detected into an electric signal, which is transmitted to the steering system of the rudder in order to control steering of the aircraft.

Figure 7:
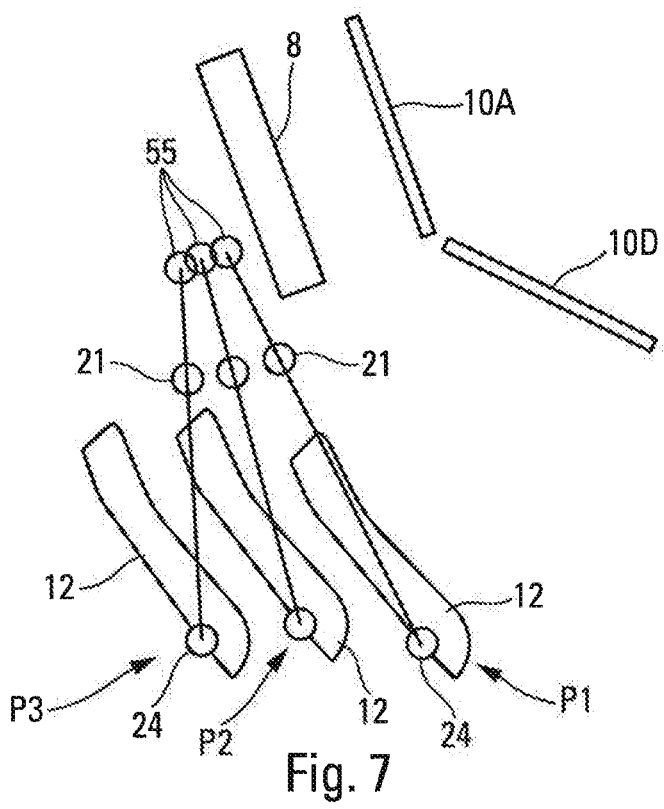
FIG. 7 diagrammatically shows different possible adjustment positions of a pedal and of a pedal arm of the rudder bar.

Furthermore, the rudder bar 1 also incorporates an adjustment assembly 50 which allows the pedal arm 19 to be displaced at the hinge (provided with the axis of rotation 21) as illustrated in FIG. 4 and thereby to approach or distance the pedals to or from the pilot's seat. This adjustment component 50, which may comprise a manual screw jack or an electric jack 51, thus allows the positions and travel of the pedals to be changed and adapted to the pilot. FIG. 7, illustrates three different positions P1, P2 and P3 (with corresponding axes of rotation 21, 24 and 55) of the pedal 12 and its associated pedal arm 19.

The rudder bar 1 has ergonomics and functionalities practically identical to those of a conventional rudder bar.

Figure 9:
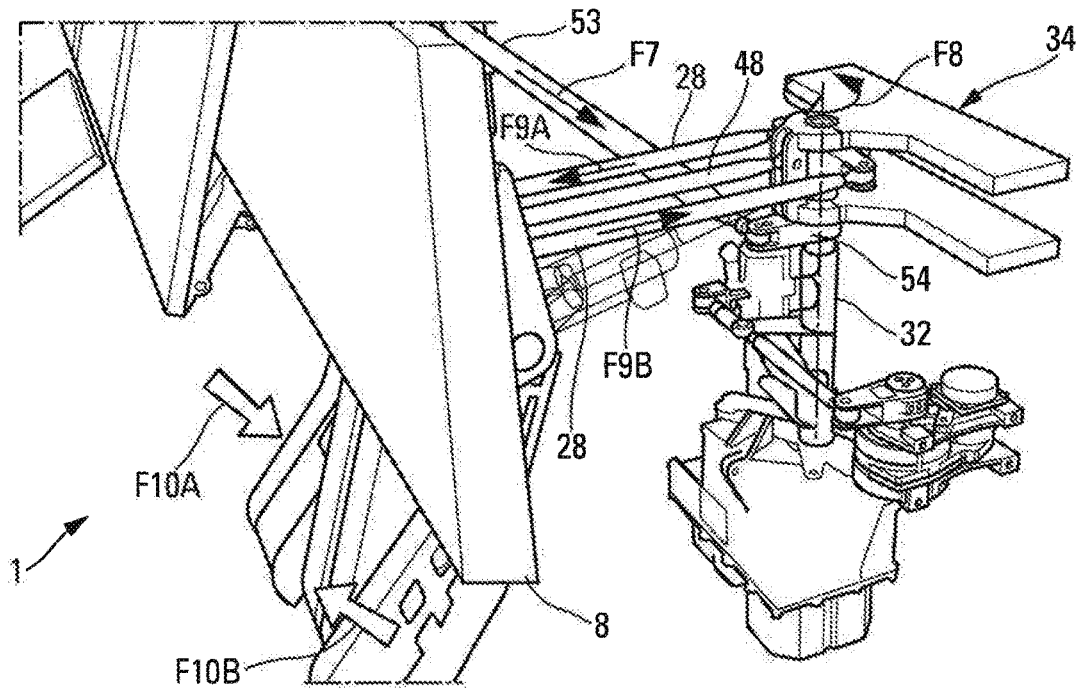

Furthermore, the rudder bar 1, which is equipped with two pairs of pedals and associated means, also incorporates a rod 53 (steering interconnecting rod), which allows an operation of one pair of pedals (of the pilot or co-pilot) to be transmitted to the other pair of pedals as shown in FIGS. 8 and 9 by being linked in a hinged manner to the transmission shafts 32 associated respectively with these pairs. This rod 53 is hinged, at its two extremities, to a supporting component 54 in the shape of a stirrup. Each supporting component 54 is integral with a steering shaft 32. The rotation of a steering shaft 32 under the action of the associated pair of pedals therefore generates, via the rod 53, the same rotation of the other steering shaft, which drives a similar displacement of the other pair of pedals.

More precisely, the rotation of one steering shaft 32 under the action of the associated pair of pedals (generating displacements F3 and F3A of the rods 28 of FIG. 8) around the steering axis 33 as illustrated by the arrow F5 (FIG. 8) generates the displacement of the rod 53 in the direction illustrated by an arrow F7 in FIGS. 8 and 9. This displacement drives the other steering shaft 32 in rotation as illustrated by an arrow F8 in FIG. 9. This rotation F8 generates the displacement of the rods 28 associated with this steering shaft 32 in opposite directions illustrated by arrows F9A and F9B, which causes the rotation of the corresponding pedal arms and the displacement of the pedals, illustrated by arrows F10A and F10B.

Furthermore, the set of secondary hinges 17 of the rudder bar 1 also comprises, as illustrated in FIG. 5: a component 55 of the PDFU (pedal damper) type relative to a dynamic brake; and a component 56 of the PFTU (power failure transfer unit) type provided with a law of effort.

The architecture of the rudder bar 1 as described above has numerous advantages. In particular: this architecture completely liberates the floor of the specific constraints of the rudder bar, providing a simplification of the floor, together with the possibility of making a module of its assembly, and it incorporates an integration generating a significant space gain; it does not require a structural casing due to the multifunctional nature of the structural parts of the instrument panel, of the forward structural base and of the rudder bar; it offers a simplified embodiment and uses fewer parts. A weight saving and significant simplification are thereby obtained; its cost is reduced; the same functionalities and ergonomics as a conventional rudder bar are substantially retained; the main components are made in the shape of shells, namely the pedal arm and the hinge parts on the instrument panel. These components can be manufactured in particular by 3D printing; the pedal travel is adjustable; and braking functions can be embodied in a conventional manner. However, they are preferably embodied by fluid transfer, which provides significant gains.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rudder bar for an aircraft including a flight deck equipped with an instrument panel, a forward area of the aircraft situated forward of the flight deck and a supporting structure configured to support the instrument panel, the rudder bar comprising:
   a set of primary hinges coupled to a set of pedals,
   a set of secondary hinges, and
   a set of structural links between the set of primary hinges and the set of secondary hinges,
   wherein said set of pedals is configured to be suspended over a floor of the flight deck and supported by the supporting structure,
   wherein the set of secondary hinges is configured to be attached to a structural component of the forward area of the aircraft,
   wherein said set of structural links comprises at least one fixed structural rod fixed, at one end, to the structural component and, at an opposite end, supporting the supporting structure,
   wherein the at least one fixed structural rod forms a cantilevered beam supporting the supporting structure, and
   wherein the at least one fixed structural rod supports the set of primary hinges.

2. The rudder bar as claimed in claim 1, wherein said set of primary hinges is configured to be suspended from the supporting structure, and
   wherein said set of secondary hinges is configured to be suspended from the structural component.

3. The rudder bar as claimed in claim 1, wherein said set of primary hinges comprises, for each of the pedals, a pedal arm to which a respective one of the pedals is connected, the pedal arm being mounted to pivot with respect to the structural component, and wherein the pedal arm suspends the pedal above a floor of the flight deck.

4. The rudder bar as claimed in claim 1, wherein said set of secondary hinges comprises a steering shaft mounted to move in rotation around a steering axis, the steering shaft being linked via at least one linkage to a steering position sensor.

5. The rudder bar as claimed in claim 1, wherein said set of structural links comprises, for each pedal, a rod connected at a first extremity of the rod to a pedal arm of a respective one of the primary hinges corresponding to the pedal and at an opposite extremity the rod is coupled to a steering shaft of the one of the secondary hinges corresponding to a respective one of the pedals.

6. The rudder bar as claimed in claim 1, wherein the rudder bar includes a second set of primary hinges coupled to a second set of pedals,
   a second set of secondary hinges, and
   a second set of structural links between the second set of primary hinges and the second set of secondary hinges,
   wherein said second set of pedals is suspended over the floor of the flight deck and is supported by the supporting structure, and
   wherein the second set of secondary hinges is attached to at least one structural component of the forward area, and the rudder bar further comprises a steering interconnecting rod connected to each of the set of secondary hinges and the second set of the secondary hinges.

7. The rudder bar as claimed in claim 6, wherein the steering interconnecting rod is linked, in a hinged manner, to transmission shafts associated respectively with each of the set of pedals and the second set of pedals.

8. The rudder bar as claimed in claim 1, wherein each pedal of said set of pedals is mounted on a pedal arm, and wherein each of said pedal arms is in a shell shape.

9. The rudder bar as claimed in claim 1, further comprising an adjustment assembly configured to adjust a position of displacement distance of at least one pedal of the set of pedals.

10. An aircraft incorporating the rudder bar claimed in claim 1.

11. The aircraft as claimed in claim 10, wherein said set of primary hinges is suspended from the structure supporting the instrument panel, and wherein said set of secondary hinges is attached to the structural component of the forward area.

12. A rudder bar in a flight deck of an aircraft comprising:
a pair of pedals configured to be operated by a pilot;
a pair of primary hinges, wherein an end of each of the primary hinges of the pair of primary hinges is connected to a respective one pedal of the pair of pedals;
a supporting rod at an elevation above the pair of pedals, wherein the supporting rod is connected to the pair of primary hinges;
a cantilevered rod extending rearward into the flight deck from a first end of the cantilevered rod which is fixed to a structural component of a fuselage of the aircraft, wherein a second end of the cantilevered rod, opposite to the first end, supports the supporting rod;
a pair of secondary hinges supported by the first end of the cantilevered rod and connected to a pair of rods which connect to the pair of primary hinges, wherein each secondary hinge of the pair of secondary hinges is connected by a rod of the pair of rods to a respective one of the primary hinges of the pair of primary hinges; and
a steering shaft connected to the pair of secondary hinges, wherein an axial displacement of at least one rod of the pair of rods turns the steering shaft.

13. The rudder bar of claim 12 further comprising:
a second pair of pedals configured to be operated by another pilot;
a second pair of primary hinges, wherein an end of each of the primary hinges of the second pair is connected to a respective one pedal of the second pair of pedals;
the supporting structure is above the second pair of pedals and pivotably connected to each of the primary hinges of the second pair of primary hinges;
a second cantilevered rod extending rearward into the flight deck from a second structural component of the fuselage of the aircraft, wherein an end of the second cantilevered rod opposite to the second structural component supports the supporting structure;
a second pair of secondary hinges connected to a second pair of rods which connect to the second set of primary hinges, wherein each secondary hinge of the secondary pair of secondary hinges is connected by one rod of the second Gct pair rods to a respective one of the primary hinges of the second pair of primary hinges; and
a second steering interconnecting rod connected to each of the set second pair of secondary hinges and the second pair of the secondary hinges.

14. The rudder bar as claimed in claim 1, wherein the cantilevered beam is pivotably fixed to the second set of secondary hinges.

15. The rudder bar as claimed in claim 12, wherein the cantilevered rod is pivotably fixed to the second set of secondary hinges.

* * * * *